(12) United States Patent
Chen

(10) Patent No.: US 9,256,052 B2
(45) Date of Patent: Feb. 9, 2016

(54) WIDE-ANGLE LENS

(71) Applicants: Sintai Optical (Shenzhen) Co., Ltd., Shenzhen, Guandong Province (CN); Asia Optical International Ltd., Tortola (GB)

(72) Inventor: Po-Yu Chen, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

( * ) Notice: Subject to any disclaimer, the term of this patent is extended or adjusted under 35 U.S.C. 154(b) by 47 days.

(21) Appl. No.: 14/207,762

(22) Filed: Mar. 13, 2014

(65) Prior Publication Data

US 2014/0307334 A1    Oct. 16, 2014

(30) Foreign Application Priority Data

Apr. 16, 2013    (TW) ................. 102113416

(51) Int. Cl.
| | |
|---|---|
| *G02B 9/60* | (2006.01) |
| *G02B 13/18* | (2006.01) |
| *G02B 13/00* | (2006.01) |
| *G02B 13/04* | (2006.01) |

(52) U.S. Cl.
CPC .............. *G02B 13/0045* (2013.01); *G02B 9/60* (2013.01); *G02B 13/04* (2013.01)

(58) Field of Classification Search
CPC .............. G02B 9/00; G02B 9/60; G02B 9/62; G02B 9/64; G02B 13/0045
USPC ......... 359/708, 713, 714, 745, 746, 754–756, 359/761–763, 770
See application file for complete search history.

(56) References Cited

U.S. PATENT DOCUMENTS

| | | | | |
|---|---|---|---|---|
| 7,768,719 | B2 * | 8/2010 | Jung et al. ...................... | 359/762 |
| 8,289,628 | B2 * | 10/2012 | Asami ............................ | 359/714 |
| 2009/0002849 | A1 * | 1/2009 | Kim et al. ....................... | 359/749 |
| 2010/0254025 | A1 * | 10/2010 | Yoshida et al. ................ | 359/717 |

FOREIGN PATENT DOCUMENTS

TW        M385700        8/2010

* cited by examiner

*Primary Examiner* — Darryl J Collins
(74) *Attorney, Agent, or Firm* — McClure, Qualey & Rodack, LLP

(57) ABSTRACT

A wide-angle lens includes a first lens, a second lens, a third lens, a fourth lens and a fifth lens, all of which are arranged in sequence from an object side to an image side along an optical axis. The first lens is with negative refractive power and includes a concave surface facing the image side. The second lens is a biconcave lens with negative refractive power. The third lens is a biconvex lens with positive refractive power. The fourth lens is a biconvex lens with positive refractive power. The fifth lens is with negative refractive power and includes a concave surface facing the object side.

14 Claims, 9 Drawing Sheets

WIDE-ANGLE LENS

BACKGROUND OF THE INVENTION

1. Field of the Invention

The invention relates to a lens, and more particularly to a wide-angle lens.

2. Description of the Related Art

Generally, the front group lens of a known wide-angle lens is with negative refractive power and the rear group lens thereof is with positive refractive power to increase the field of view. However, a known wide-angle lens still has problems such as unsatisfactory aberration and image resolution and being susceptible to environmental temperature change. There is room for improvement.

BRIEF SUMMARY OF THE INVENTION

The invention provides a wide-angle lens to solve the above problems. The wide-angle lens of the invention, provided with characteristics of a smaller F-number, a larger field of view, and miniaturization, still has a good optical performance. Also, the resolution of image shot by the wide-angle lens can meet requirement and the effect of environmental temperature change on optical performance is reduced.

The wide-angle lens in accordance with an exemplary embodiment of the invention includes a first lens, a second lens, a third lens, a fourth lens and a fifth lens, all of which are arranged in sequence from an object side to an image side along an optical axis. The first lens is with negative refractive power and includes a concave surface facing the image side. The second lens is a biconcave lens with negative refractive power. The third lens is a biconvex lens with positive refractive power. The fourth lens is a biconvex lens with positive refractive power. The fifth lens is with negative refractive power and includes a concave surface facing the object side.

In another exemplary embodiment, the wide-angle lens satisfies: $3.15<|TTL/BFL|<3.65$ wherein TTL is a total lens length of the wide-angle lens and BFL is a back focal length of the wide-angle lens.

In yet another exemplary embodiment, the first lens satisfies: $2.4<|f_1/f|<2.95$ wherein $f_1$ is an effective focal length of the first lens and f is an effective focal length of the wide-angle lens.

In another exemplary embodiment, the second lens satisfies: $1.2<|f_2/f|<1.7$ wherein $f_2$ is an effective focal length of the second lens and f is an effective focal length of the wide-angle lens.

In yet another exemplary embodiment, the third lens satisfies: $0.95<|f_3/f|<1.6$ wherein $f_3$ is an effective focal length of the third lens and f is an effective focal length of the wide-angle lens.

In another exemplary embodiment, the first lens further includes a surface, and the surface or the concave surface or both are aspheric surfaces.

In yet another exemplary embodiment, the second lens includes two concave surfaces, at least one of which is an aspheric surface or both of which are aspheric surfaces.

In another exemplary embodiment, the third lens includes two convex surfaces, at least one of which is an aspheric surface or both of which are aspheric surfaces.

In yet another exemplary embodiment, the fourth lens includes two convex surfaces, at least one of which is an aspheric surface or both of which are aspheric surfaces.

In another exemplary embodiment, the fifth lens further includes a surface, and the surface or the concave surface or both are aspheric surfaces.

In yet another exemplary embodiment, the third lens includes two convex surfaces, at least one of which is a spherical surface or both of which are spherical surfaces.

In another exemplary embodiment, the first lens, the second lens, the fourth lens and the fifth lens are made of plastic material.

In yet another exemplary embodiment, the third lens is made of glass material.

In another exemplary embodiment, the wide-angle lens further includes a stop disposed between the third lens and the fourth lens.

A detailed description is given in the following embodiment with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
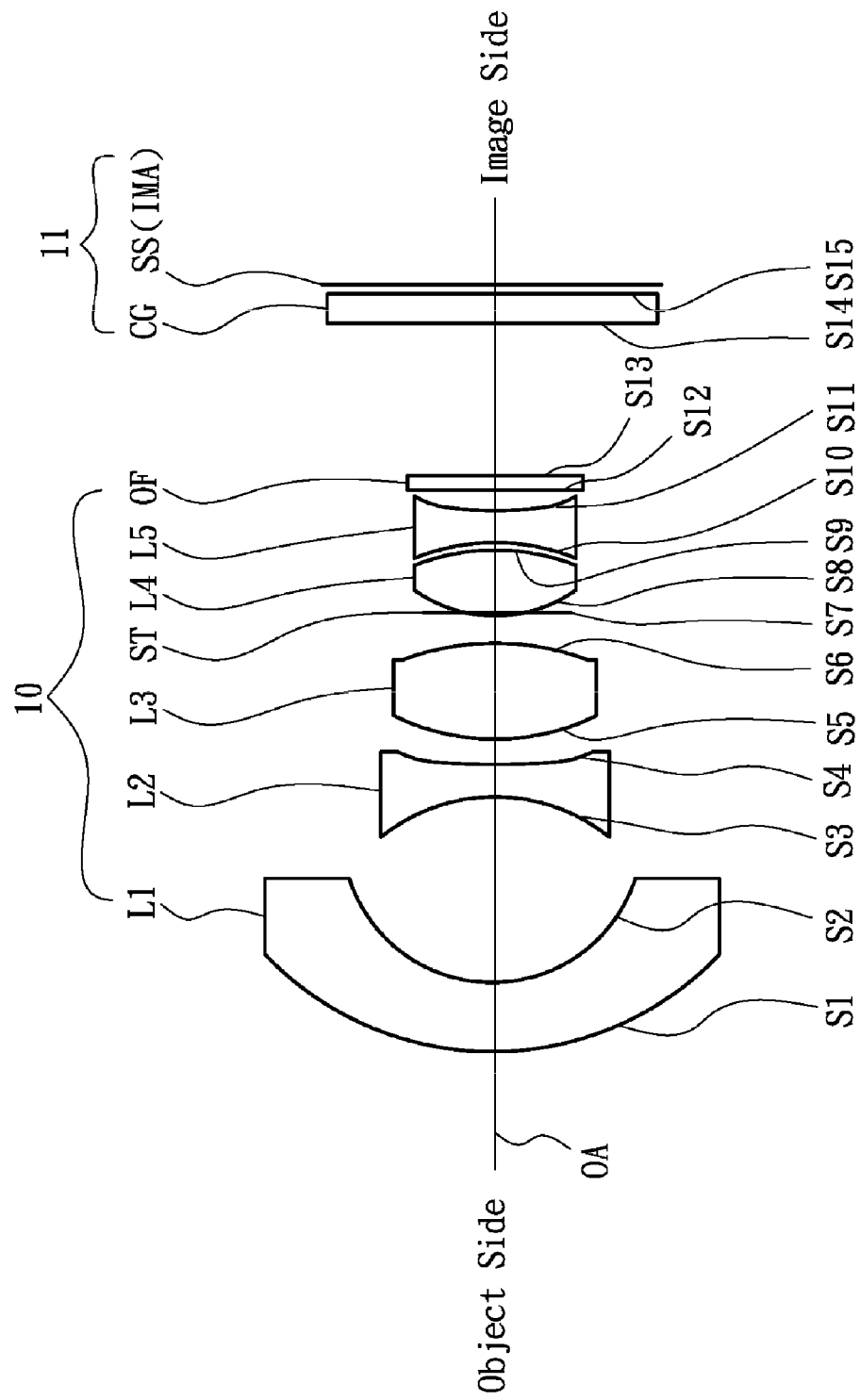
FIG. 1 is a lens layout diagram of a wide-angle lens in accordance with an embodiment of the invention.

Referring to FIG. 1, FIG. 1 is a lens layout diagram of a wide-angle lens in accordance with an embodiment of the invention. The wide-angle lens 10 includes a first lens L1, a second lens L2, a third lens L3, a stop ST, a fourth lens L4, a fifth lens L5 and an optical filter OF, all of which are arranged in sequence from an object side to an image side along an optical axis OA. An image sensor 11 is disposed between the optical filter OF and the image side, wherein a sensing surface SS of the image sensor 11 is disposed in an image plane IMA. The first lens L1 is made of plastic material and with negative refractive power, wherein the image side surface S2 is a concave surface and both of the object side surface S1 and image side surface S2 are aspheric surfaces. The second lens L2 is a biconcave lens, with negative refractive power and made of plastic material, wherein the object side surface S3 and image side surface S4 are aspheric surfaces. The third lens L3 is a biconvex lens, with positive refractive power and made of glass material, wherein the object side surface S5 and image side surface S6 are aspheric surfaces. The fourth lens L4 is a biconvex lens, with positive refractive power and made of plastic material, wherein the object side surface S8 and image side surface S9 are aspheric surfaces. The fifth lens L5 is made of plastic material and with negative refractive power, wherein the object side surface S10 is a concave surface and both of the object side surface S10 and image side surface S11 are aspheric surfaces. The optical filter OF is a glass plate, wherein both of the object side surface S12 and image side surface S13 are plane surfaces. The image sensor 11 includes a cover glass CG and a sensor element (not shown). The cover glass CG, including a surface S14 and a surface S15 both of which are plane surfaces, is used to protect sensor surface SS of the sensor element from scratches or dust.

In order to maintain excellent optical performance of the wide-angle lens in accordance with the embodiment, the wide-angle lens 10 must satisfies the following four conditions:

$$3.15 < |TTL/BFL| < 3.65 \quad (1)$$

$$2.4 < |f_1/f| < 2.95 \quad (2)$$

$$1.2 < |f_2/f| < 1.7 \quad (3)$$

$$0.95 < |f_3/f| < 1.6 \quad (4)$$

wherein TTL is a total lens length of the wide-angle lens 10, BFL is a back focal length of the wide-angle lens 10, f is an effective focal length of the wide-angle lens 10, $f_1$ is an effective focal length of the first lens L1, $f_2$ is an effective focal length of the second lens L2, $f_3$ is an effective focal length of the third lens L3.

By the above design of the lenses and stop ST, the wide-angle lens 10 is provided with a shortened total lens length, an effective corrected aberration, and an increased resolution. Also, an effect of environmental temperature change on the optical performance of the wide-angle lens 10 is reduced.

In order to achieve the above purpose and effectively enhance the optical performance, the wide-angle lens 10 of the embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens.

TABLE 1

| Effective Focal Length = 2.435 mm | | | | | |
| F-number = 2.0 | | | | | |
| Field of View = 85.9° | | | | | |
| Total Lens Length = 11.187 mm | | | | | |

| Surface Number | Radius of Curvature (mm) | Thickness (mm) | Nd | Vd | Remark |
|---|---|---|---|---|---|
| S1 | 4.662486 | 0.9739534 | 1.535 | 56.07 | The First Lens L1 |
| S2 | 1.846327 | 2.751026 | | | |
| S3 | −2.06604 | 0.456239 | 1.544 | 56.09 | The Second Lens L2 |
| S4 | 34.22386 | 0.3403792 | | | |
| S5 | 2.631254 | 1.414948 | 1.589 | 61.15 | The Third Lens L3 |
| S6 | −4.447667 | 0.4676587 | | | |
| S7 | ∞ | −0.05252407 | | | Stop ST |
| S8 | 2.153787 | 0.953907 | 1.544 | 56.09 | The Fourth Lens L4 |
| S9 | −3.023499 | 0.1041318 | | | |
| S10 | −2.004093 | 0.4832932 | 1.636 | 23.9 | The Fifth Lens L5 |
| S11 | −17.17553 | 0.3 | | | |
| S12 | ∞ | 0.21 | 1.517 | 64.17 | Optical Filter OF |
| S13 | ∞ | 2.3 | | | |
| S14 | ∞ | 0.4 | 1.517 | 64.17 | Cover Glass CG |
| S15 | ∞ | 0.08561348 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the embodiment, the conic constant k and the aspheric coefficients A, B, C, D of each surface are shown in Table 2.

TABLE 2

| Surface Number | k | A | B | C | D |
|---|---|---|---|---|---|
| S1 | 0 | 0.000844162 | −7.51E−07 | −1.30E−05 | 8.87E−07 |
| S2 | −0.9256385 | 0.010994601 | 0.000590234 | 0.00020566 | −4.72E−05 |
| S3 | −0.4675223 | 0.017766712 | 0.004490741 | −0.000538945 | −1.91E−05 |
| S4 | 0 | 0.020306413 | 0.002242534 | 0.001926433 | −9.66E−05 |
| S5 | 1.499351 | −0.018645327 | −0.012840674 | 0.004038897 | −0.001603134 |
| S6 | −34.5342 | −0.037031874 | 0.016684016 | −0.008666082 | 0.002010511 |
| S8 | 1.148442 | −0.013270099 | −0.017000495 | 0.005022185 | −0.001087914 |
| S9 | 0 | 0.023735484 | −0.003058884 | −0.013639973 | 0.007954745 |
| S10 | −3.547558 | 0.14135181 | −0.10551235 | 0.020628274 | −0.000236901 |
| S11 | −1608.029 | 0.17146971 | −0.034919122 | −0.017322265 | 0.00742203 |

For the wide-angle lens 10 of the embodiment, the total lens length TTL of the wide-angle lens 10 is equal to 11.187 mm, the back focal length BFL of the wide-angle lens 10 is equal to 3.296 mm, the effective focal length f of the wide-angle lens 10 is equal to 2.435 mm, the effective focal length $f_1$ of the first lens L1 is equal to 6.483 mm, the effective focal length $f_2$ of the second lens L2 is equal to −3.555 mm, and the effective focal length $f_3$ of the third lens L3 is equal to 3.018 mm. According to the above data, the following values can be obtained:

|TTL/BFL|=3.394,

|$f_1$/f|=2.662,

|$f_2$/f|=1.460,

|$f_3$/f|=1.239, which respectively satisfy the above conditions (1)-(4).

Figure 2A:
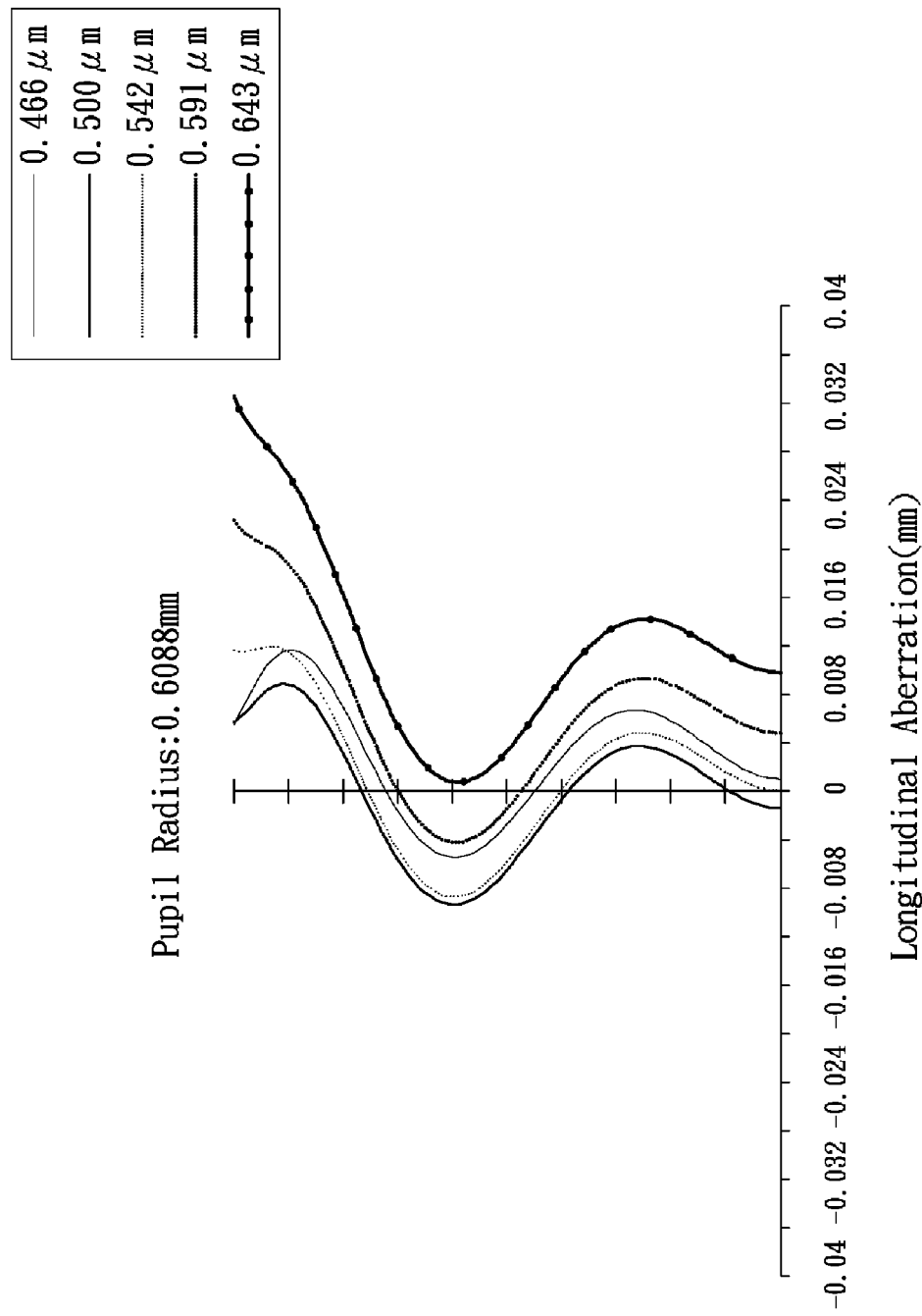
FIG. 2A is a longitudinal aberration diagram of the wide-angle lens in accordance with the embodiment of the invention.
Figure 2B:
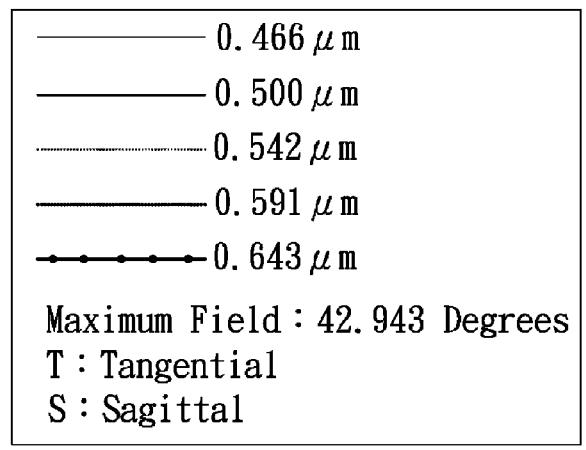
FIG. 2B is a field curvature diagram of the wide-angle lens in accordance with the embodiment of the invention.
Figure 2B:
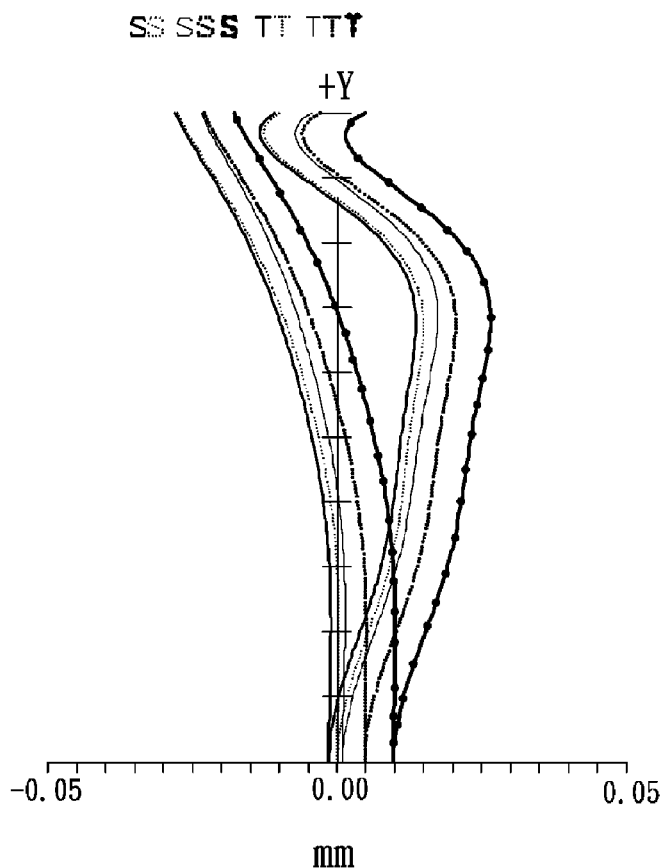
Figure 2C:
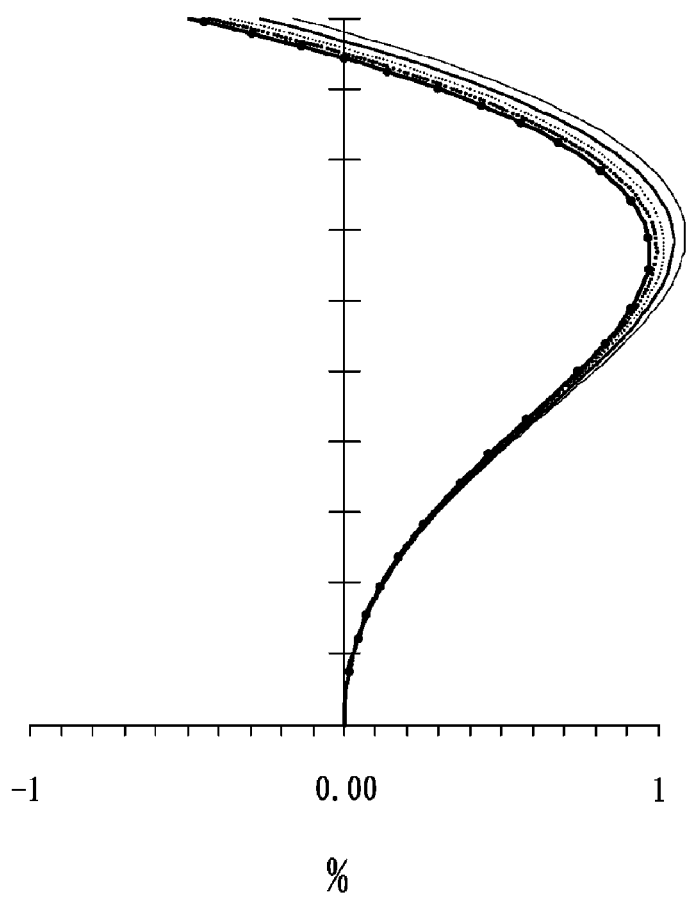
FIG. 2C is a distortion diagram of the wide-angle lens in accordance with the embodiment of the invention.
Figure 2D:
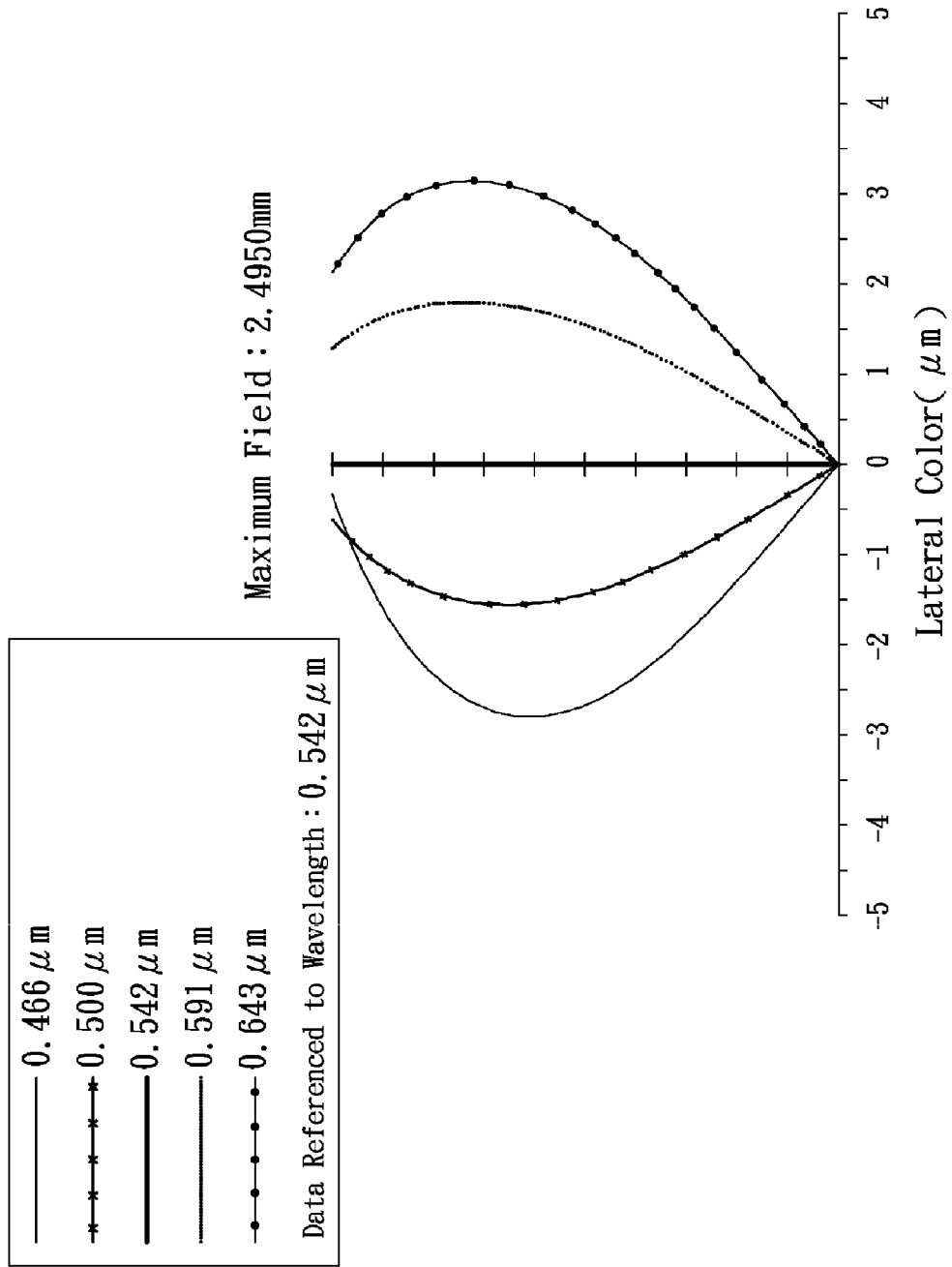
FIG. 2D is a lateral color diagram of the wide-angle lens in accordance with the embodiment of the invention.
Figure 2E:
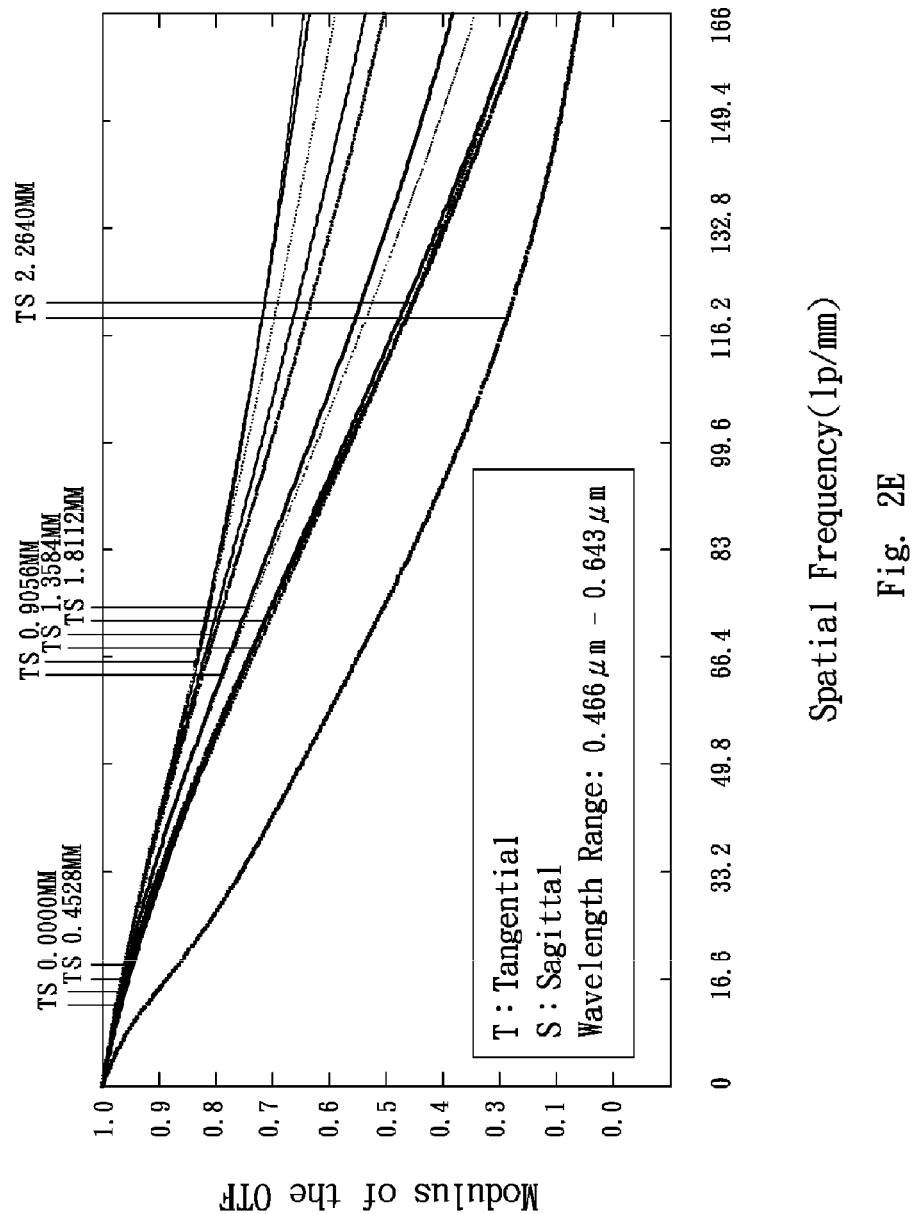
FIG. 2E is a modulation transfer function diagram of the wide-angle lens in accordance with the embodiment of the invention.
Figure 2F:
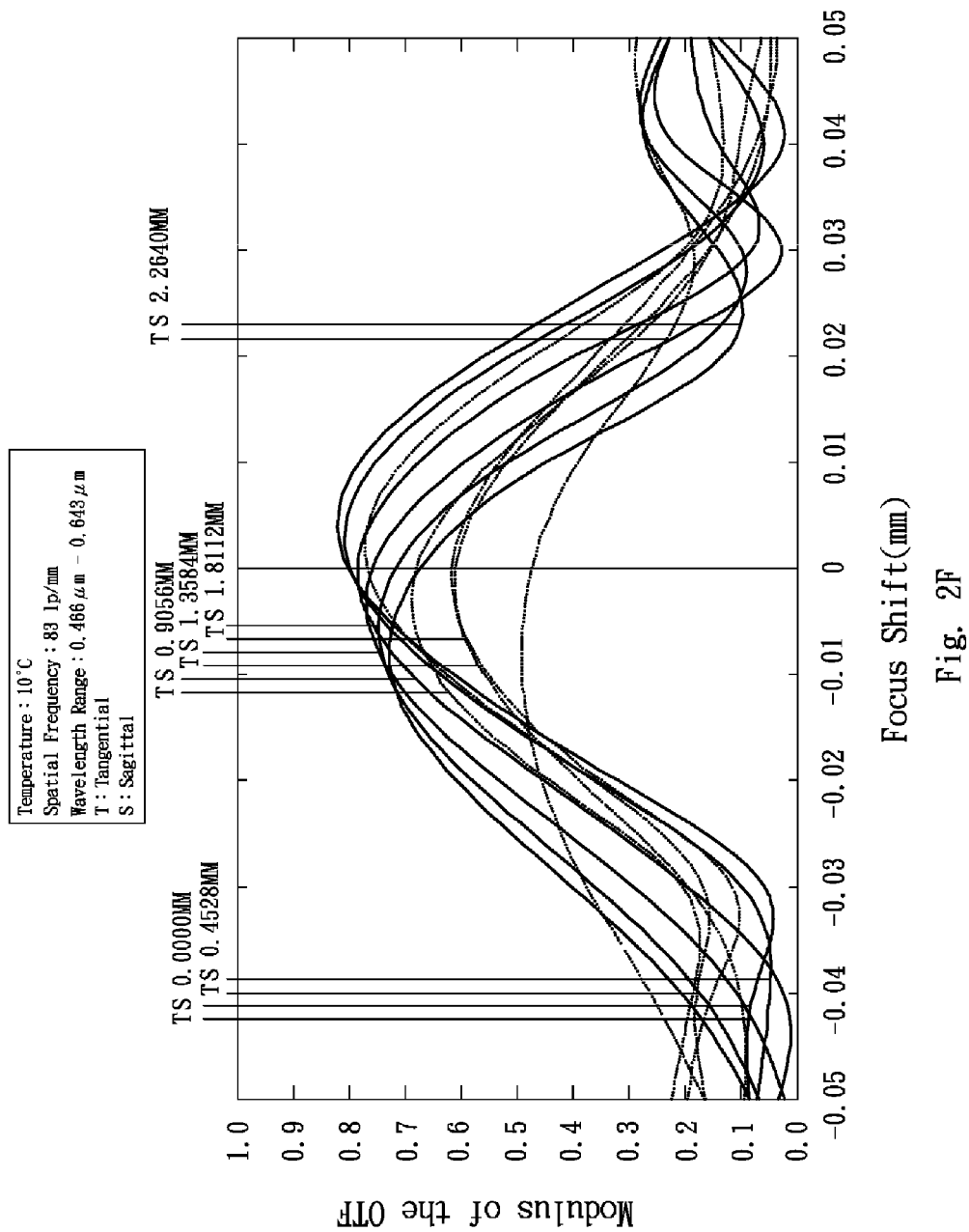
FIG. 2F is a through focus modulation transfer function diagram as temperature is equal to 10° C. for the wide-angle lens in accordance with the embodiment of the invention.
Figure 2G:
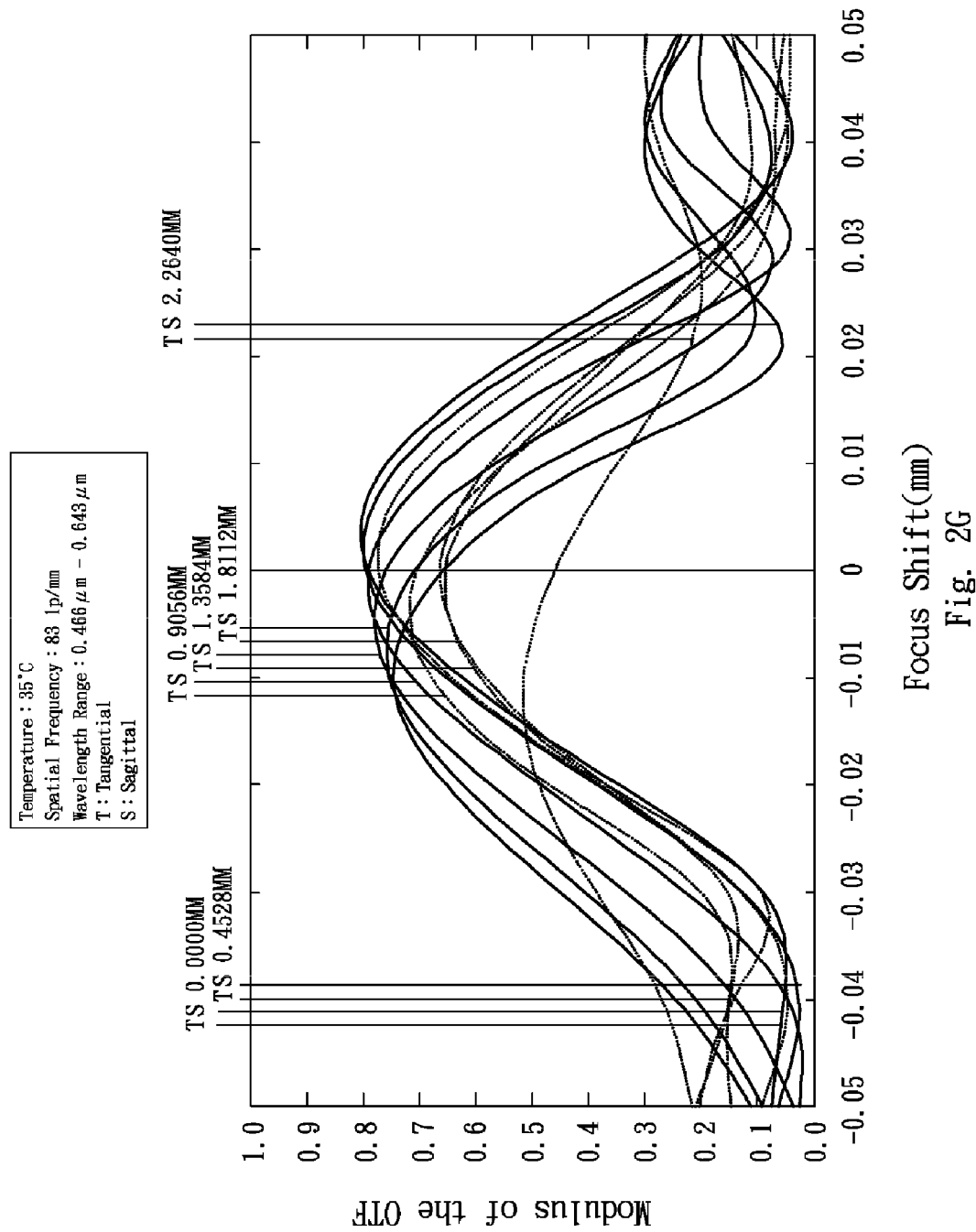
FIG. 2G is a through focus modulation transfer function diagram as temperature is equal to 35° C. for the wide-angle lens in accordance with the embodiment of the invention.
Figure 2H:
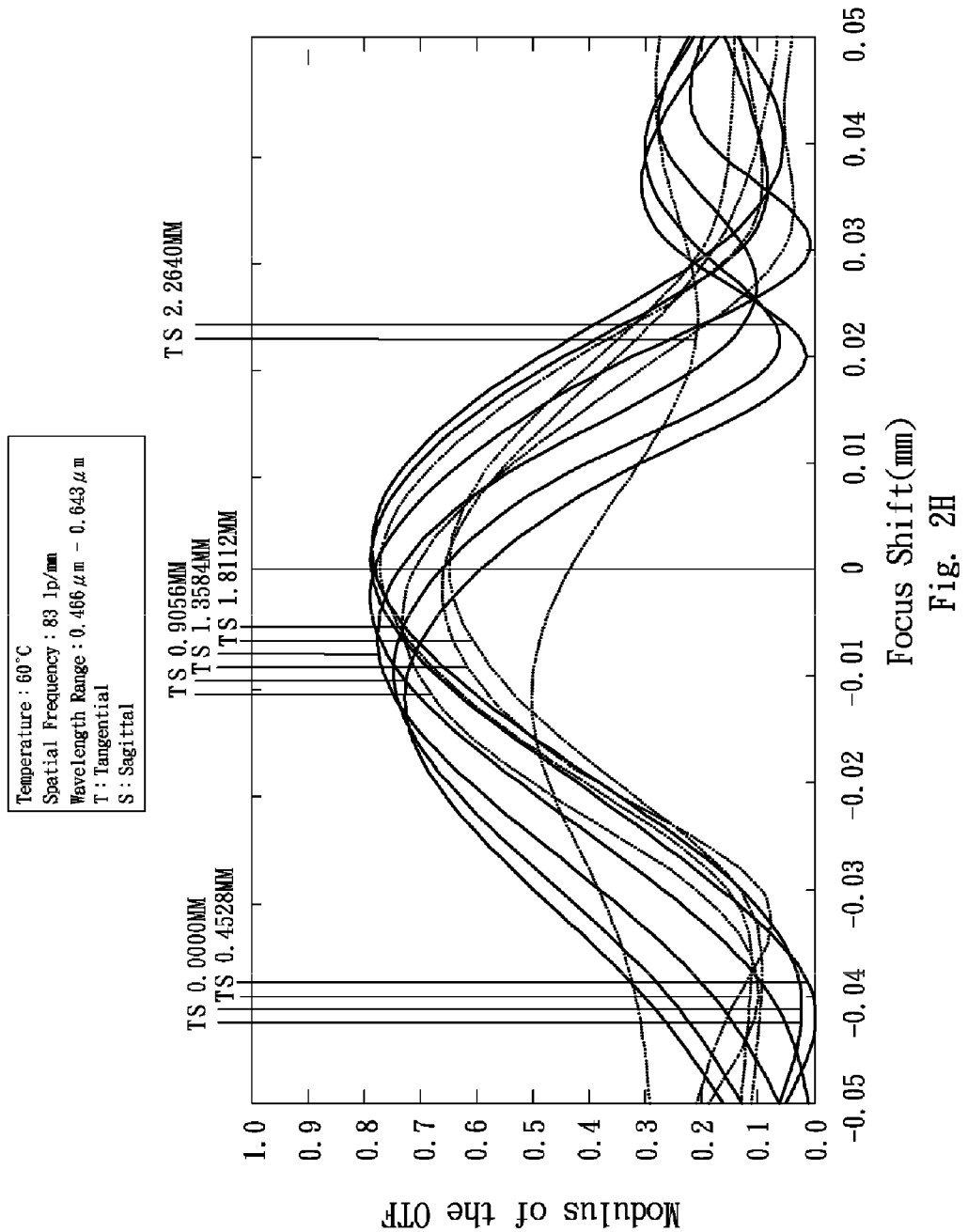
FIG. 2H is a through focus modulation transfer function diagram as temperature is equal to 60° C. for the wide-angle lens in accordance with the embodiment of the invention.

By the above arrangements of the lenses and stop ST, the wide-angle lens 10 of the embodiment can meet the requirements of optical performance as seen in FIGS. 2A-2H, wherein FIG. 2A shows the longitudinal aberration diagram of the wide-angle lens 10 in accordance with the embodiment of the invention, FIG. 2B shows the field curvature diagram of the wide-angle lens 10 in accordance with the embodiment of the invention, FIG. 2C shows the distortion diagram of the wide-angle lens 10 in accordance with the embodiment of the invention, FIG. 2D shows the lateral color diagram of the wide-angle lens 10 in accordance with the embodiment of the invention, FIG. 2E shows the modulation transfer function diagram of the wide-angle lens 10 in accordance with the embodiment of the invention, FIG. 2F shows the through focus modulation transfer function diagram as temperature is equal to 10° C. for the wide-angle lens 10 in accordance with the embodiment of the invention, FIG. 2G shows the through focus modulation transfer function diagram as temperature is equal to 35° C. for the wide-angle lens 10 in accordance with the embodiment of the invention and FIG. 2H shows the through focus modulation transfer function diagram as temperature is equal to 60° C. for the wide-angle lens 10 in accordance with the embodiment of the invention.

It can be seen from FIG. 2A that the longitudinal aberration in the wide-angle lens 10 of the present embodiment ranges between −0.010 mm and 0.036 mm for the wavelength of 0.466 μm, 0.500 μm, 0.542 μm, 0.591 μm and 0.643 μm. It can be seen from FIG. 2B that the field curvature of tangential direction and sagittal direction in the wide-angle lens 10 of the present embodiment ranges between −0.03 mm and 0.03 mm for the wavelength of 0.466 μm, 0.500 μm, 0.542 μm, 0.591 μm and 0.643 μm. It can be seen from FIG. 2C that the distortion in the wide-angle lens 10 of the present embodiment ranges between −0.6% and 1.2% for the wavelength of 0.466 μm, 0.500 μm, 0.542 μm, 0.591 μm and 0.643 μm. It can be seen from FIG. 2D that the lateral color of different fields in the wide-angle lens 10 of the present embodiment ranges between −3.0 μm and 3.5 μm for the wavelength of 0.466 μm, 0.500 μm, 0.542 μm, 0.591 μm and 0.643 μm. It can be seen from FIG. 2E that the modulation transfer function of tangential direction and sagittal direction in the wide-angle lens 10 of the present embodiment ranges between 0.15 and 1.0 wherein the wavelength ranges between 0.466 μm and 0.643 μm, each field is 0.0000 mm, 0.4528 mm, 0.9056 mm, 1.3584 mm, 1.8112 mm and 2.2640 mm, spatial frequency ranges between 0 lp/mm and 166 lp/mm. It can be seen from FIG. 2F that the through focus modulation transfer function of tangential direction and sagittal direction in the wide-angle lens 10 of the present embodiment is greater than 0.2 as focus shift ranges between −0.024 mm and 0.017 mm wherein the wavelength ranges between 0.466 μm and 0.643 μm, each field is 0.0000 mm, 0.4528 mm, 0.9056 mm, 1.3584 mm, 1.8112 mm and 2.2640 mm, spatial frequency is equal to 83 lp/mm, and temperature is equal to 10° C. It can be seen from FIG. 2G that the through focus modulation transfer function of tangential direction and sagittal direction in the wide-angle lens 10 of the present embodiment is greater than 0.2 as focus shift ranges between −0.025 mm and 0.015 mm wherein the wavelength ranges between 0.466 μm and 0.643 μm, each field is 0.0000 mm, 0.4528 mm, 0.9056 mm, 1.3584 mm, 1.8112 mm and 2.2640 mm, spatial frequency is equal to 83 lp/mm, and temperature is equal to 35° C. It can be seen from FIG. 2H that the through focus modulation transfer function of tangential direction and sagittal direction in the wide-angle lens 10 of the present embodiment is greater than 0.2 as focus shift ranges between −0.026 mm and 0.013 mm wherein the wavelength ranges between 0.466 μm and 0.643 μm, each field is 0.0000 mm, 0.4528 mm, 0.9056 mm, 1.3584 mm, 1.8112 mm and 2.2640 mm, spatial frequency is equal to 83 lp/mm, and temperature is equal to 60° C. It is obvious that the longitudinal aberration, the field curvature, the distortion and the lateral color of the wide-angle lens 10 of the present embodiment can be corrected effectively, the image resolution can meet the requirement, the effect of environmental temperature change on depth of focus is small, and the wide-angle lens 10 is not easily out of focus even when environmental temperature changes. Therefore, the wide-angle lens 10 of the invention is capable of good optical performance.

In the above embodiment, both of the object side surface S5 and image side surface S6 of the third lens L3 are aspheric surfaces. However, it has the same effect and falls into the scope of the invention that both of the object side surface S5 and image side surface S6 of the third lens L3 are changed into spherical surfaces.

In the above embodiment, the first lens L1, the second lens L2, the fourth lens L4 and the fifth lens L5 are made of plastic material. However, it has the same effect and falls into the scope of the invention that a part or all of the first lens L1, the second lens L2, the fourth lens L4 and the fifth lens L5 are made of glass material.

In the above embodiment, the first lens L1, the second lens L2, the fourth lens L4 and the fifth lens L5 are made of plastic material, while the third lens L3 is made of glass material. However, it has the same effect and falls into the scope of the invention that the third lens L3 is made of plastic material and a part of or all of the first lens L1, the second lens L2, the fourth lens L4 and the fifth lens L5 are made of glass material.

While the invention has been described by way of examples and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A wide-angle lens comprising a first lens, a second lens, a third lens, a fourth lens and a fifth lens, all of which are arranged in sequence from an object side to an image side along an optical axis, wherein:
the first lens is with negative refractive power and comprises a concave surface facing the image side;
the second lens is a biconcave lens with negative refractive power;

the third lens is a biconvex lens with positive refractive power;

the fourth lens is a biconvex lens with positive refractive power; the fifth lens is with negative refractive power and comprises a concave surface facing the object side; and the wide-angle lens satisfies:

$$3.15 < |TTL/BFL| < 3.65$$

wherein TTL is a total lens length of the wide-angle lens and BFL is a back focal length of the wide-angle lens.

2. The wide-angle lens as claimed in claim 1, wherein the first lens satisfies:

$$2.4 < |f_1/f| 2.95$$

wherein f1 is an effective focal length of the first lens and f is an effective focal length of the wide-angle lens.

3. The wide-angle lens as claimed in claim 1, wherein the second lens satisfies:

$$1.2 < |f_2/f| < 1.7$$

wherein f2 is an effective focal length of the second lens and f is an effective focal length of the wide-angle lens.

4. The wide-angle lens as claimed in claim 1, wherein the third lens satisfies:

$$0.95 < |f_3/f| < 1.6$$

wherein f3 is an effective focal length of the third lens and f is an effective focal length of the wide-angle lens.

5. The wide-angle lens as claimed in claim 1, wherein the first lens further comprises a surface, and the surface or the concave surface or both are aspheric surfaces.

6. The wide-angle lens as claimed in claim 1, wherein the second lens comprises two concave surfaces, at least one of which is an aspheric surface or both of which are aspheric surfaces.

7. The wide-angle lens as claimed in claim 1, wherein the third lens comprises two convex surfaces, at least one of which is an aspheric surface or both of which are aspheric surfaces.

8. The wide-angle lens as claimed in claim 1, wherein the fourth lens comprises two convex surfaces, at least one of which is an aspheric surface or both of which are aspheric surfaces.

9. The wide-angle lens as claimed in claim 1, wherein the fifth lens further comprises a surface, and the surface or the concave surface or both are aspheric surfaces.

10. The wide-angle lens as claimed in claim 1, wherein the third lens comprises two convex surfaces, at least one of which is a spherical surface or both of which are spherical surfaces.

11. The wide-angle lens as claimed in claim 1, wherein the first lens, the second lens, the fourth lens and the fifth lens are made of plastic material.

12. The wide-angle lens as claimed in claim 1, wherein the third lens is made of glass material.

13. The wide-angle lens as claimed in claim 1, further comprising a stop disposed between the third lens and the fourth lens.

14. A wide-angle lens comprising a first lens, a second lens, a third lens, a fourth lens and a fifth lens, all of which are arranged in sequence from an object side to an image side along an optical axis, wherein:

the first lens is with negative refractive power and comprises a concave surface facing the image side;

the second lens is a biconcave lens with negative refractive power;

the third lens is a biconvex lens with positive refractive power;

the fourth lens is a biconvex lens with positive refractive power;

the fifth lens is with negative refractive power and comprises a concave surface facing the object side; and the first lens satisfies:

$$2.4 < |f_1/f| < 2.95$$

wherein f1 is an effective focal length of the first lens and f is an effective focal length of the wide-angle lens.

* * * * *